(12) United States Patent
Den Hollander et al.

(10) Patent No.: US 7,630,363 B2
(45) Date of Patent: Dec. 8, 2009

(54) APPARATUS FOR ADJUSTING RECEIVING TIME POINT OF BURST DATA IN OPTICAL BURST SWITCHING NETWORK AND METHOD THEREOF

(75) Inventors: Cornelis Johannis Den Hollander, Suwon-si (KR); Geoffrey M. Garner, Red Bank, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 579 days.

(21) Appl. No.: 11/321,623

(22) Filed: Dec. 30, 2005

(65) Prior Publication Data

US 2006/0146888 A1    Jul. 6, 2006

(30) Foreign Application Priority Data

Dec. 31, 2004   (KR) .................. 10-2004-0117774
Dec. 8, 2005    (KR) .................. 10-2005-0119366

(51) Int. Cl.
  *H04Q 11/00*    (2006.01)
  *H04J 3/06*     (2006.01)
  *H04B 10/12*    (2006.01)

(52) U.S. Cl. .................. 370/375; 370/503; 398/154

(58) Field of Classification Search .................. None
  See application file for complete search history.

(56) References Cited

U.S. PATENT DOCUMENTS

| | | | | |
|---|---|---|---|---|
| 5,485,298 A | * | 1/1996 | Haas | 398/54 |
| 5,497,261 A | * | 3/1996 | Masetti | 398/154 |
| 6,778,730 B2 | * | 8/2004 | Hironishi | 385/24 |
| 6,798,790 B1 | * | 9/2004 | Enssle et al. | 370/503 |
| 6,963,564 B1 | * | 11/2005 | Liu | 370/389 |
| 7,212,551 B1 | * | 5/2007 | Beshai et al. | 370/509 |
| 7,408,959 B2 | * | 8/2008 | Braff et al. | 370/508 |
| 2005/0175348 A1 | * | 8/2005 | Neddam et al. | 398/102 |

* cited by examiner

*Primary Examiner*—Hong Cho
*Assistant Examiner*—Robert C Scheibel
(74) *Attorney, Agent, or Firm*—Sughrue Mion, PLLC

(57) ABSTRACT

An apparatus and method for adjusting a receiving time point of burst data in an optical burst switching network is provided. The method includes comparing a reference time point of a node with a time slot boundary of the burst data; and adjusting the time slot boundary of the burst data in accordance with the reference time point. The apparatus includes a sync detection section which is configured to detect a difference between a time slot boundary of the burst data and a reference time point; and a sync control section which is configured to control shifting and re-aligning the received burst data with the reference time point according to the difference detected by the sync detection section.

15 Claims, 8 Drawing Sheets

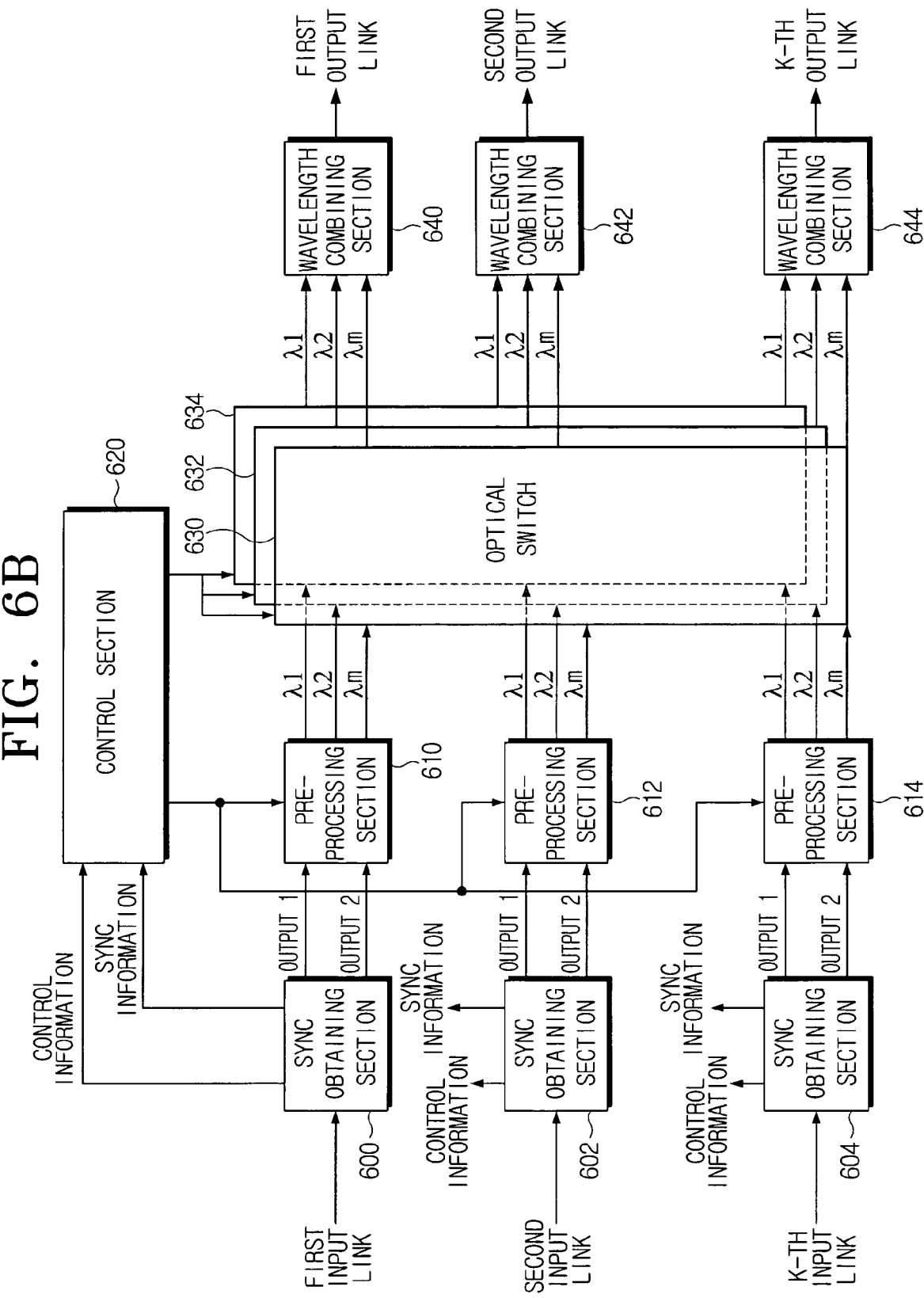

APPARATUS FOR ADJUSTING RECEIVING TIME POINT OF BURST DATA IN OPTICAL BURST SWITCHING NETWORK AND METHOD THEREOF

CROSS-REFERENCE TO RELATED APPLICATION

This application claims benefit under 35 U.S.C. § 119 (a) from Korean Patent Application No. 2004-117774 filed on Dec. 31, 2004 in the Korean Intellectual Property Office and Korean Patent Application No. 2005-119366 filed on Dec. 8, 2005 in the Korean Intellectual Property Office, and the entire contents of these two Applications are incorporated herein by reference.

BACKGROUND OF THE INVENTION

1. Field of the Invention

The present invention relates generally to an optical burst switching (OBS) network. More particularly, the present invention relates to an apparatus and method for adjusting a receiving time point of burst data and performing synchronization by compensating for a difference of the receiving time point of the burst data and a reference clock of a node which results from physical differences of links connecting nodes in an OBS network.

2. Description of the Related Art

Generally, an electric switch is used when an optical signal is transmitted through an optical fiber. In order to process the incoming optical signal. However, the electric switch should perform a process of converting the optical signal into an electric signal and then converting the electric signal into an optical signal. Accordingly, an opto-electric converter for converting the optical signal into the electric signal and an electro-optic converter for converting the electric signal into the optical signal are additionally required, and this causes the installation cost to increase.

In order to solve this problem, an optical burst switch that can directly process the optical signal without the necessity of converting the optical signal into the electric signal has been proposed. Hereinafter, an optical burst switching network using the optical burst switch will be explained.

Generally, in the optical burst switching network, internet protocol (IP) packets entering into an optical domain are gathered as burst data at an edge node, and such burst data are routed through a core node according to their destination or Quality of Service (QoS) to be sent to their destination node. Additionally, burst control packets (BCPs) and the burst data (BD) are offset and separately transmitted through different channels. That is, since the BCPs are transmitted prior to the burst data by an offset time and pre-engage a path through which the burst data is to be transferred, the burst data can rapidly be transmitted through the optical network. Hereinafter, the process of transmitting optical data will be explained with reference to FIG. 1.

FIG. 1 illustrates nodes that transmit and/or receive or switch the burst data in an optical burst switching network. The burst data is transmitted in the optical burst switching network as follows.

If IP packets are input, a node A 100 gathers the IP packets and makes burst data at an edge node. Edge nodes, such as node A 100, node D 106, or node E 108, serve to gather the IP packets, make and transmit a burst data packet, or to receive and separate an optical burst data packet into IP packets. Core nodes, such as node B 102 or node C 104, serve to perform optical switching of the optical burst data. If the burst data having a desired size is generated, the node A 100 generates and transmits the burst control packet (BCP) to the node B 102. After an offset time, the node A transmits the burst data to the node B 102. The BCP includes information about a destination address of the burst data, a source address of the burst data, a size of the burst data, a QoS, a offset time, or other control information known in the art.

The node B 102 confirms the destination address of the burst data to be received using the transferred BCP, determines an optical path, and reserves an optical switching time. Although an opto-electric or electro-optic conversion of the burst control packet is performed in the node B 102, the burst data follows the optical path through the optical switching without any opto-electric conversion. The node B 102 can perform optical switching of the burst data transmitted from the node A 100 according to the destination of the burst data, i.e., whether the destination of the burst data is the node D 106 or the node E 108.

As described above, the node B 102 transfers the burst data transmitted from the node A 100 to the node D 106 or the node E 108. However, the node B 102 may also be the destination of the burst data generated from the node A 100, or may directly generate the burst data to be transferred to the node D 106 or the node E 108. In other words, the node A 100 that is the core node may have the function of the edge node.

FIG. 2 illustrates links connected to a core node that includes a conventional optical switch. Referring to FIG. 2, the links connected to the core node are first to k-th input links and first to k-th output links. The burst data received through the first input link is output to one of the first to k-th output links by the optical switch 200.

As illustrated in FIG. 2, the burst data input to the optical switch 200 do not have the same input time point and size. In other words, the burst data arrive at the inputs to the optical switch at different times and the burst data are of different widths, i.e. one block of burst data may have more data than another. Since the size of the burst data is varied within a set maximum size, the size of the burst data transferred to the first input link is not generally equal to that of the burst data transferred to the k-th input link as illustrated in FIG. 2.

If the burst data input to the optical switch have different sizes and input time points, the switching efficiency of the optical switch deteriorates. Accordingly, in order to increase the switching efficiency of the optical switch, a scheme for equally setting the sizes and input time points of the burst data has been proposed, which is called a time-slotted optical burst switching (OBS).

FIG. 3 illustrates a time-slotted OBS. As illustrated in FIG. 3, the burst data transferred through the first to k-th input links connected to the optical switch 200 have the same size and input time point. By keeping the sizes and input time points of the burst data transferred to the links equal to one another as described above, the switching efficiency of the optical switch 200 can be heightened.

FIG. 4 is a view explaining a problem that may occur in the case of implementing the time-slotted OBS. In FIG. 4, a node A 400, a node B 402 and a node C 404 are illustrated. The node C 404 is connected to each of the node A 400 and the node B 402 by links, and receives the burst data from the node A 400 and the node B 402 using the links. Undoubtedly, the links transfer the burst control packet that includes control information about the burst data.

However, there may be physical differences among the links that connect the node A 400 and the node C 404, the link that connects the node B 402 and the node C 404, and the link connected to the output terminal of the node C 404. Referring to FIG. 4, the natural frequency of the link that connects the node A 400 and the node C 404 is $f_a = f_{nom} + \Delta f_a$, and the natural frequency of the link that connects the node A 400 and the node B 402 is $f_b = f_{nom} + \Delta f_b$. Also, the natural frequency of the link connected to the output terminal of the node C 404 is $f_c = f_{nom} + \Delta f_c$. Accordingly, even if the node A 400 and the node B 402 transfer the burst data to the node C 404 through the links at the same time point, the arrival times of the burst data at the node C 404 become different from each other.

FIG. 5 illustrates the problem explained with reference to FIG. 4. As illustrated in FIG. 5, the receiving time points and time slot boundaries of the burst data transferred to the first input link, the burst data transferred to the second input link and the burst data transferred to the k-th input link are different from one another. Specifically, the receiving time point $t_1$ of the burst data transferred to the first input link is relatively late in comparison to the receiving time point $t_2$ of the burst data transferred to the second input link. Also, the receiving time point $t_2$ of the burst data transferred to the second input link is relatively early in comparison to the receiving time point $t_k$ of the burst data transferred to the k-th input link. Accordingly, it is required to provide a method that can compensate for the differences among the receiving time points of the burst data and among the time slot boundaries that occur due to the differences among the natural frequencies of the links.

SUMMARY OF THE INVENTION

The present invention has been developed in order to address the above drawbacks and other problems associated with the conventional arrangement. An aspect of the present invention is to provide a method for compensating for the physical differences among links for connecting nodes that constitute an optical bust switching network.

Another aspect of the present invention is to provide a method that can compensate for receiving time points and time slot boundaries of burst data occurring due to the physical differences among links for connecting nodes.

According to an exemplary embodiment of the present invention, there is provided a method for adjusting a receiving time point of burst data in an optical burst switching network, the method including comparing a reference time point of a node with a time slot boundary of the burst data; and adjusting the time slot boundary of the burst data in accordance with the reference time point.

According to another exemplary embodiment of the present invention, there is provided an apparatus for adjusting a receiving time point of burst data in an optical burst switching network, the apparatus including a sync detection section which is configured to detect a difference between a time slot boundary of the burst data and a reference time point by comparing the reference time point with the time slot boundary of the burst data; and a sync control section which is configured to control the adjustment of the received burst data in accordance with the reference time point in order to match the reference time point with the time slot boundary of the burst data using the difference detected by the sync detection section.

BRIEF DESCRIPTION OF THE DRAWINGS

The above and other aspects of the present invention will be more apparent by describing certain exemplary embodiments of the present invention with reference to the accompanying drawings, in which:

FIG. 6B is a view illustrating a construction of a core node according to an exemplary embodiment of the present invention;

DETAILED DESCRIPTION OF EXEMPLARY EMBODIMENTS OF THE PRESENT INVENTION

Figure 1:
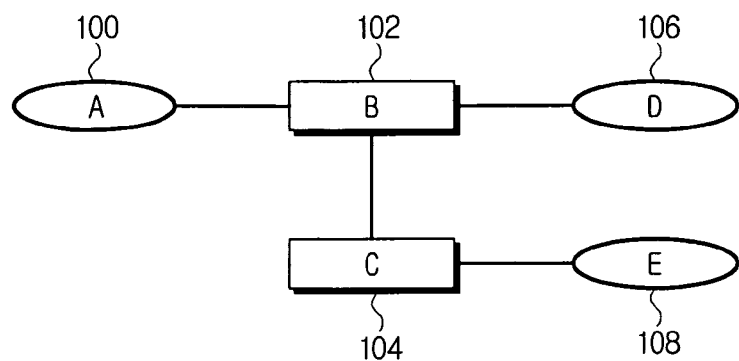
FIG. 1 is a view illustrating a general optical burst switching network having a plurality of nodes.
Figure 2:
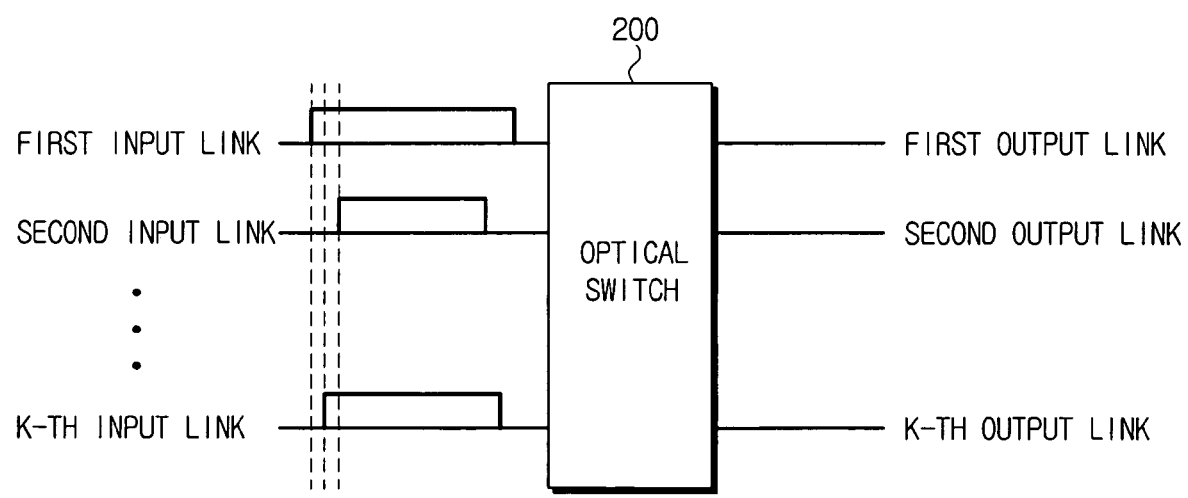
FIG. 2 is a view illustrating a conventional process of transferring burst data having different input time points and sizes to an optical switch.
Figure 3:
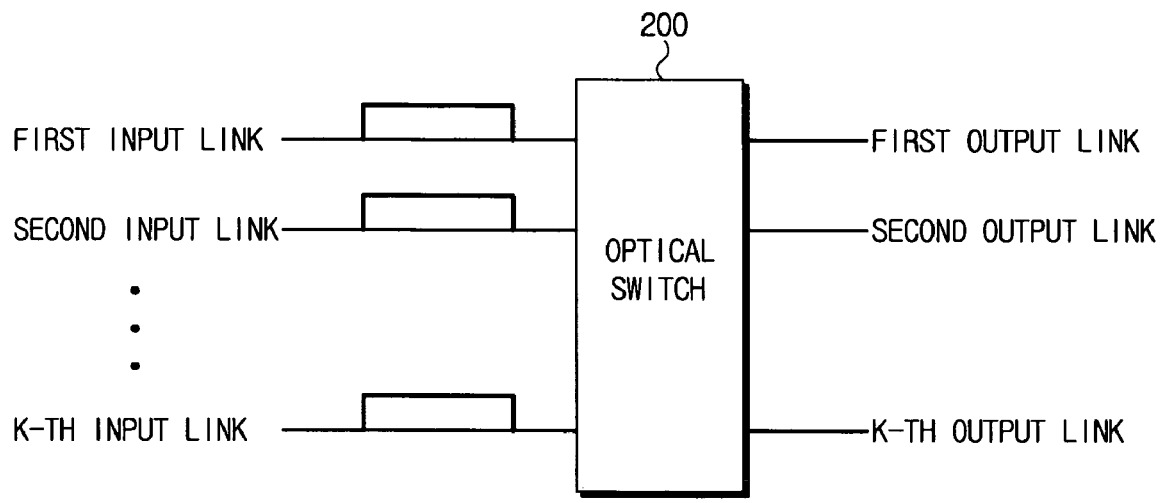
FIG. 3 is a view illustrating a conventional time-slotted optical burst switching network.
Figure 4:
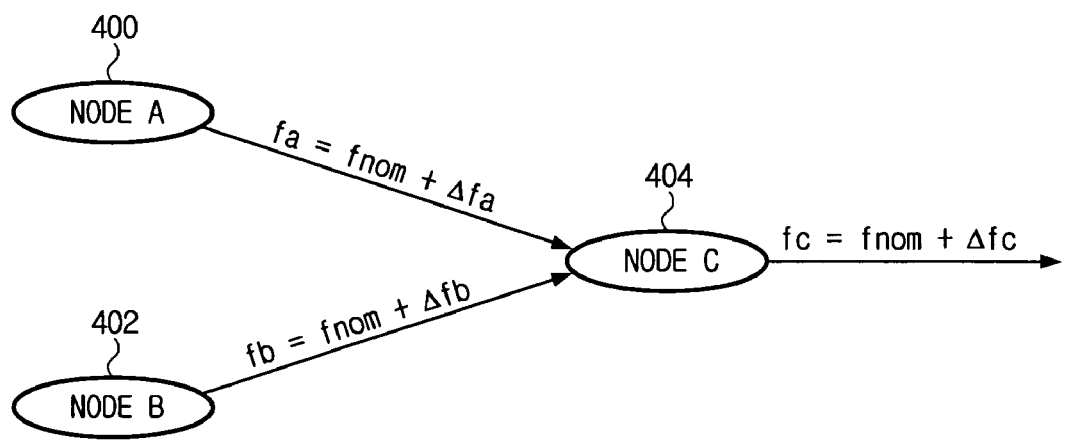
FIG. 4 is a view illustrating physical differences among links that connect nodes in an optical burst switching network.
Figure 5:
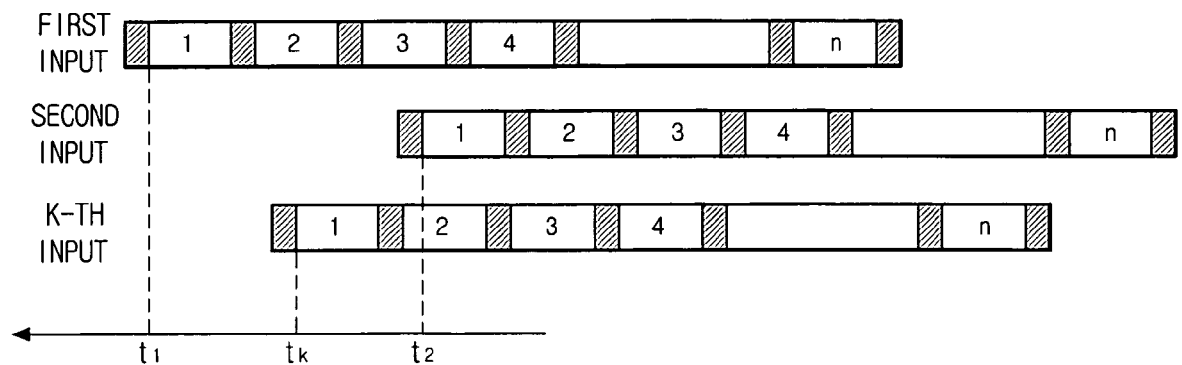
FIG. 5 is a view illustrating differences among the receiving time points of burst data due to the physical differences among links that connect nodes.

A method for compensating for the differences among receiving time points of burst data transferred to an optical switch that occurs due to the differences among natural frequencies of links according to exemplary embodiments of the present invention will be described in greater detail with reference to the accompanying drawings.

In the following description, same drawing reference numerals are used for the same elements even in different drawings. The matters defined in the description such as a detailed construction and elements are provided to assist one skilled in the art with a comprehensive understanding of the invention. Thus, it is apparent that the present invention can be carried out without those defined matters. Also, well-known functions or constructions are not described in detail since they would obscure the invention in unnecessary detail.

Figure 6A:
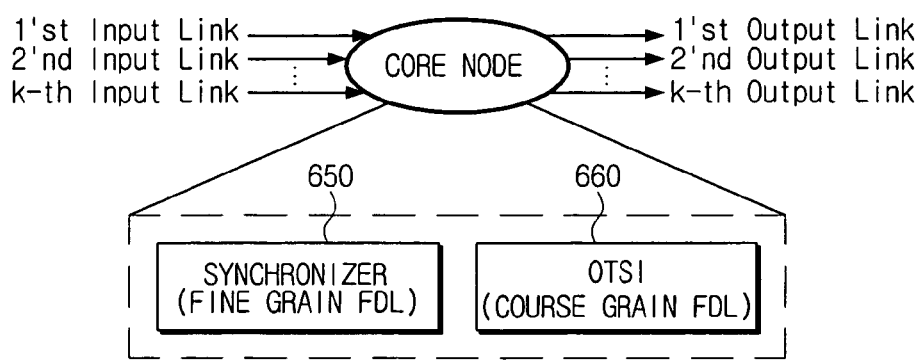
FIG. 6A is a view illustrating a core node according to an exemplary embodiment of the present invention.

FIG. 6A depicts a code node according to an exemplary embodiment of the present invention.

As shown in FIG. 6A, the code node is connected with input links to receive burst data from a plurality of nodes. For example, the input links are first through k-th input links. The core node is connected with a plurality of output links to output the processed burst data. For example, the output links are first through k-th output links. It is noted that an input link can deliver a plurality of burst data having natural frequencies at the same time.

According to an exemplary embodiment of the present invention, the core node includes a synchronizer 650 and an optical time slot interchanger (OTSI) 660. The synchronizer 650 compares a clock difference with the node clock with respect to the burst data input through the input link. According to a result of the comparison, the synchronizer 650 inserts void data into the burst data in order to synchronize with the node clock, or outputs the burst data as two separate outputs out1 and out2. The burst data is separated into two outputs because the data which needs to be extracted from the burst data for the synchronization with the node clock is separated as the second output out2. Also, the synchronizer 650 is called a fine grain fiber delay loop (FDL) since it finely delays the burst data for a certain time according to the clock differences in order to synchronize with the node clock of the incoming burst data.

When the burst data synchronized with the node clock at the fine grain FDL has time slots more than a specific number, the OTSI 660 performs a course synchronization with respect to the time slots more than a specific number. Hereinafter, the time slots more than the specific number are referred to as course time slots. For example, the OTSI 660 holds the separate data which is output as the out2 for the synchronization of the burst data at the fine grain FDL. Then, when the burst data have time slots longer than a certain time and void data is present in the burst data of the corresponding time slots, the OTSI 660 inserts the separated data into the void data to thus perform the course synchronization with respect to the course time slots. In this sense, the OTSI 660 is called a course grain FDL.

A wavelength of the burst data delivered to the core node has one of λ1 through λm wavelengths in reference to FIG. 6B. In the following, a construction of the core node is explained in detail in reference to FIG. 6B.

FIG. 6B is a view illustrating the construction of the core node according to an exemplary embodiment of the present invention.

In the core node, the burst data received through the first input link is forwarded to a first sync obtaining section 600. Operations of sync obtaining sections 600, 602 and 604 will be described in detail in reference to FIGS. 7 through 10. The first sync obtaining section 600 outputs an out1 or out2 according to the clock size of the forwarded burst data.

The burst data output as the out1 or the out2 are fed to a first pre-processing section 610. Constructions and functions of pre-processing sections 610, 612 and 614 will be described in detail in reference to FIG. 11. The first pre-processing section 610 separates the fed burst data according to the wavelengths and outputs the separated data. As mentioned above, the wavelength of the burst data is one of λ1 through λm.

The burst data output from the first pre-processing section 610 is forwarded to one of first through third optical switches 630, 632 and 634. Hereafter, the burst data having the wavelength of λ1 is exemplified. The burst data output from the first through third pre-processing sections 610, 612 and 614 are fed to the third optical switch 634. The third optical switch 634 switches and forwards the fed burst data to one of the first through k-th output links. In the case that more than two burst data are fed to the third optical switch 634 at the same time, the third optical switch 634 can forward only one burst data, and cannot forward the other burst data. Thus, the burst data not forwarded are lost. To address this issue, the pre-processing sections 610, 612 and 614 delay and forward burst data, which may be in jeopardy of being lost, for a certain time so as to prevent the data loss in advance.

A first wavelength combining section 640 combines the burst data having the natural wavelengths received from the optical switches 630, 632 and 634, and transfers the combine burst data to the first output link.

The second sync obtaining section 602 which receives the burst data through the second input link and the third sync obtaining section 604 which receives the burst data through the third input link operate in the same manner as the first sync obtaining section 600. The second pre-processing section 612 and the third pre-processing section 614 operate in the same manner as the first pre-processing section 610. The second wavelength combining section 642 and the third wavelength combining section 644 operate in the same manner as the first wavelength combining section 640.

A control section 620 controls operations of the first through third pre-processing sections 610, 612 and 614, and operations of the first through third optical switches 630, 632 and 634. In addition, the control section 620 generates a burst control packet by updating control information relating to the burst data processed by the node. The generated burst control packet is transferred to a next node through the output link prior to the delivery of the burst data.

Figure 7:
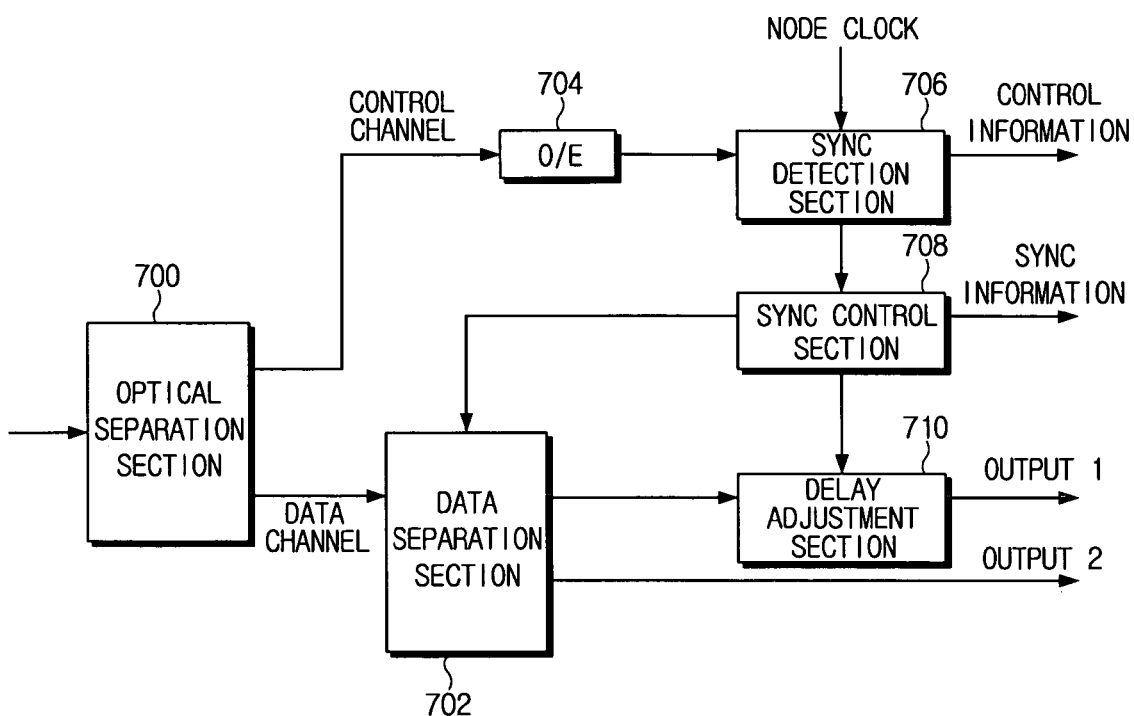
FIG. 7 is a view illustrating a construction of a sync obtaining section according to an exemplary embodiment of the present invention.

FIG. 7 depicts the construction of the sync obtaining section which compensates for a difference between receiving time points of the burst data input to the optical switch according to an exemplary embodiment of the present invention.

Referring to FIG. 7, by way of example, the first sync obtaining section 600 includes an optical separation section 700, a data separation section 702, an opto-electric conversion section 704, a sync detection section 706, a sync control section 708, and a delay adjustment section 710. Other constituent elements may be included in the first sync obtaining section 600 in addition to the above-described elements. FIG. 7 shows a configuration for convenience of explanation. Hereinafter, the functions of the first sync obtaining section 600 constructed as illustrated in FIG. 7 will be explained in order.

The optical separation section 700 separates the input link into a burst data channel and a burst control channel. Generally, since the wavelength of a channel delivering the burst data is different from the wavelength of a channel delivering the burst control packet, the optical separation section 700 separates into the burst data channel and the burst control channel using the difference of the wavelengths. Even if at least two burst data having different wavelengths and at least two burst control packets having different wavelengths are transferred through the input link, the optical separation section 700 separates into burst data and a burst control packet through the corresponding channels, that is, through the burst data channel and the burst control channel. As such, the optical separation section 700 does not separate the plurality of burst data according to their wavelengths. This is because the plurality of burst data transferred through the same link have the same reception error, and thus it is not required to compensate for the reception error.

The burst data separated by the optical separation section 700 is transferred to the data separation section 702, and the separated burst control packet is transferred to the opto-electric conversion section 704. As described above, the separated burst control packet is not directly processed, but is converted into an electric signal to be processed. The burst control packet output from the opto-electric conversion section 704 is transferred to the sync detection section 706. The sync detection section 706 compares a clock of a node with a clock of the burst data to be received using the clock of the node and the burst control packet. Generally, a clock has a specified connection with the natural frequency of the link. That is, as the natural frequency decreases, the interval of the clock becomes wider. As the natural frequency increases, the interval of the clock becomes narrower.

The information about the clock difference detected by the sync detection section 706 is transferred to the sync control section 708. Additionally, the sync detection section 706 outputs the control information about the burst data included in the burst control packet to the control section 620. The sync control section 708 processes the burst data using the transferred clock difference. That is, the sync control section 708 controls the data separation section 702 and the delay adjustment section 710 using the transferred clock difference. The processing of the burst data using the clock difference that is performed by the sync control section 708 will be explained with reference to FIGS. 9 to 10. The sync control section 708 transfers the control information (i.e., sync information) transferred to the data separation section 702 and the delay adjustment section 710 to the control section 620.

The data separation section 702 separates the transferred burst data into burst data of out1 and burst data of out2 according to a control command of the sync control section 708 to output the separated burst data. Specifically, when the interval of the received burst data is shorter than the clock interval of the node according to the control information, the data separation section 702 does not separate the received burst data but outputs it to the out1. When the interval of the received burst data is longer than the clock interval of the node according to the control information, the data separation section 702 outputs the received burst data separately to the out1 and the out2. The delay adjustment section 710 adjusts the delay of the transferred out1 burst data according to the control information from the sync control section 708.

Figure 8:
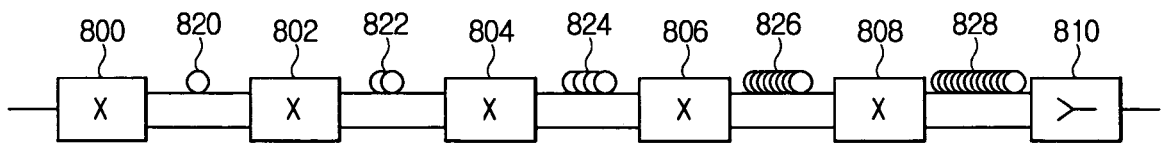
FIG. 8 is a view illustrating a construction of a delay adjustment section according to an exemplary embodiment of the present invention.

FIG. 8 is a view illustrating the construction of the delay adjustment section according to an exemplary embodiment of the present invention. Hereinafter, the construction of the delay adjustment section 710 according to an exemplary embodiment of the present invention will be explained with reference to FIG. 8.

As illustrated in FIG. 8, the delay adjustment section 710 includes a plurality of switches 800 to 810 and delay sections 820 to 828.

The first delay section 820 delays the transferred burst data for a certain initial time, the second delay section 822 delays the transferred burst data for a time corresponding to (certain initial time×2) and the third delay section 824 delays the transferred burst data for a time corresponding to (certain initial time×4). The fourth delay section 826 delays the transferred burst data for a time corresponding to (certain initial time×8) and the fifth delay section 828 delays the transferred burst data for a time corresponding to (certain initial time×16). The certain initial time may be a preset time. Accordingly, the sync control section 708 controls the delay adjustment section 610 to delay the transferred burst data as needed using the switches 800 to 810 and the delay sections 820 to 828. Although FIG. 8 illustrates five delay sections 820 to 828, it is apparent that the number of delay sections may be changed according to a user's setting.

Figure 9:
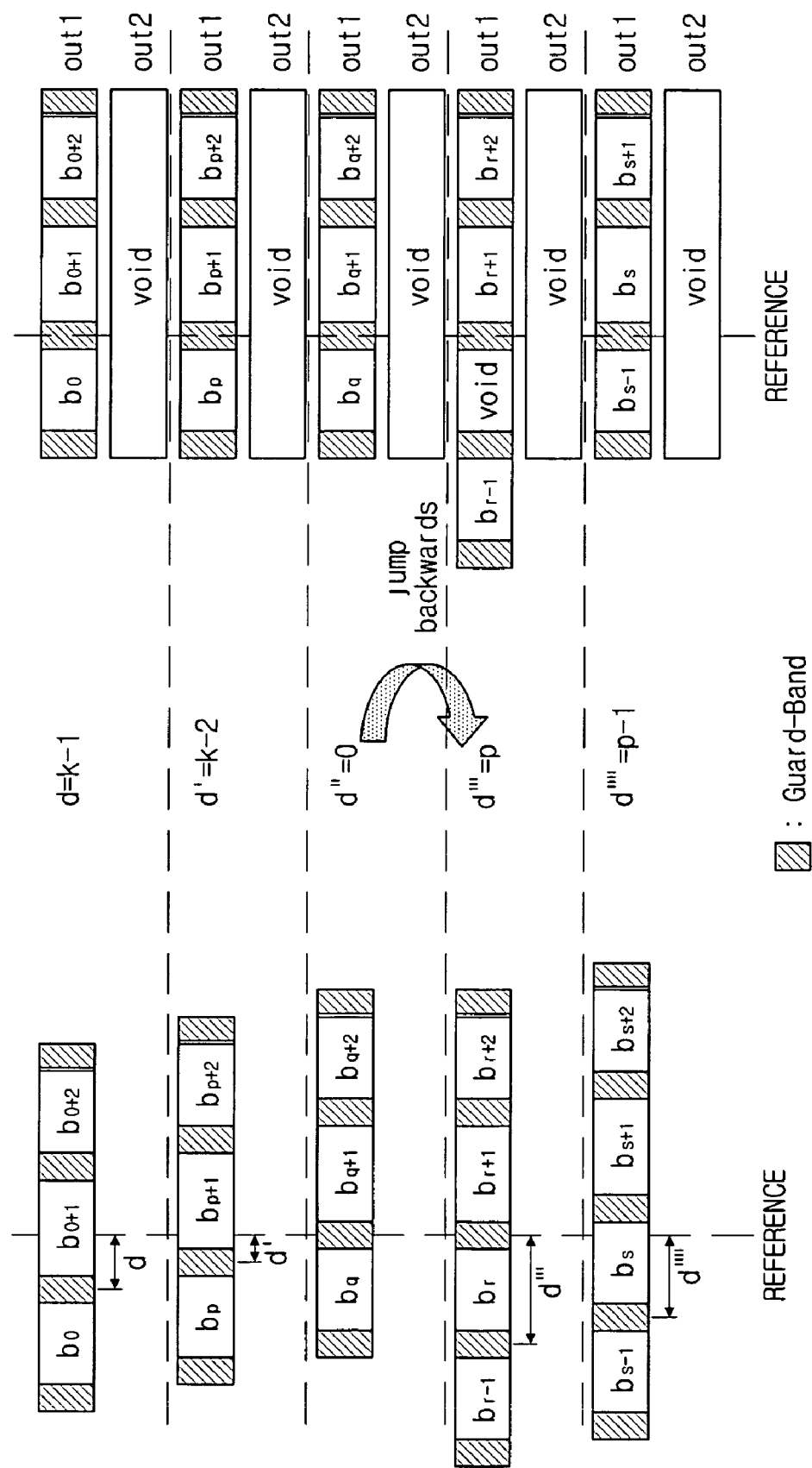
FIG. 9 is a view illustrating an example of obtaining the sync of burst data transferred from the delay adjustment section according to an exemplary embodiment of the present invention.

FIG. 9 is a view illustrating transferred burst data of which the interval is shorter than the interval of the node clock according to an exemplary embodiment of the present invention.

As described above, even if the edge nodes transfer the burst data having the same size, the sizes of the burst data received in the core node become different from one another due to the differences among the natural frequencies of the respective nodes. In FIG. 9, the core node processes the burst data using the reference clock. However, since the interval of the received burst data is shorter than the reference clock interval of the node, a method for compensating for this difference would be advantageous.

As described above, the sync detection section 706 detects the difference between the interval of the received burst data and the reference clock of the core node. Since the interval of the received burst data is shorter than the reference clock of the core node, the sync control section 708 controls the data separation section 702 and directs the data separation section 702 not to separate the received burst data. The data separation section 702 outputs the burst data to the out1 without separating according to the direction of the sync control section 708. Since the interval of the burst data input to the core node is shorter than the interval of the reference clock, every incoming burst data has a difference delayed from the reference clock, and thus a void is formed as long as the sum of differences.

The sync control section 708 acquires a delay value d through the sync detection section 706 based on Equation 1, below, in order to know how much every incoming burst data is delayed from the reference clock because the incoming burst data is smaller than the reference clock of the core node.

$$d = k \times S \quad \text{[Equation 1]}$$

In Equation 1, k denotes an integer and S denotes a fine grain delay step. When a delay step of the incoming burst data reaches p (p×S), it becomes one time-slot interval T indicated in the fine grain FDL.

In FIG. 9, for example, first incoming burst data consists of blocks $b_o$, $b_{o+1}$, $b_{o+2}$, separated by guard bands, respectively, and is delayed for d=k−1 from the reference clock. Second incoming burst data consists of $b_p$, $b_{p+1}$, and $b_{p+2}$, and is delayed for d'=k−2 from the reference clock. Third incoming burst data consists of $b_q$, $b_{q+1}$, and $b_{q+2}$, and is delayed for d"=0 from the reference clock. However, the delay value of d"=0 of the third incoming burst data implies an instance when a delay value d''' of a fourth incoming burst data corresponds to one burst data (d'''=p).

The sync control section 708 controls the delay adjustment section 710 such that void data that has no information over a period as long as the burst data. Note that the sync control section 708 directs to insert the void data and, at the same time, to shift the burst data so as to synchronize the received burst data with the core node.

Accordingly, the delay adjustment section 710 inserts the void data into the fourth incoming burst data which originally consists of blocks $b_{r1}$, $b_r$, $b_{r+1}$ and $b_{r+2}$, and outputs the burst data synchronized with the reference clock of the core node to the out1. It is understood that the first incoming burst data, the second incoming burst data and the third incoming burst data are also synchronized with the reference clock of the core node and output to the out1 as shown in FIG. 9.

As such, the delay adjustment section 710 can output the burst data having the same clock (the same burst data interval) as the reference clock of the core node.

Figure 10:
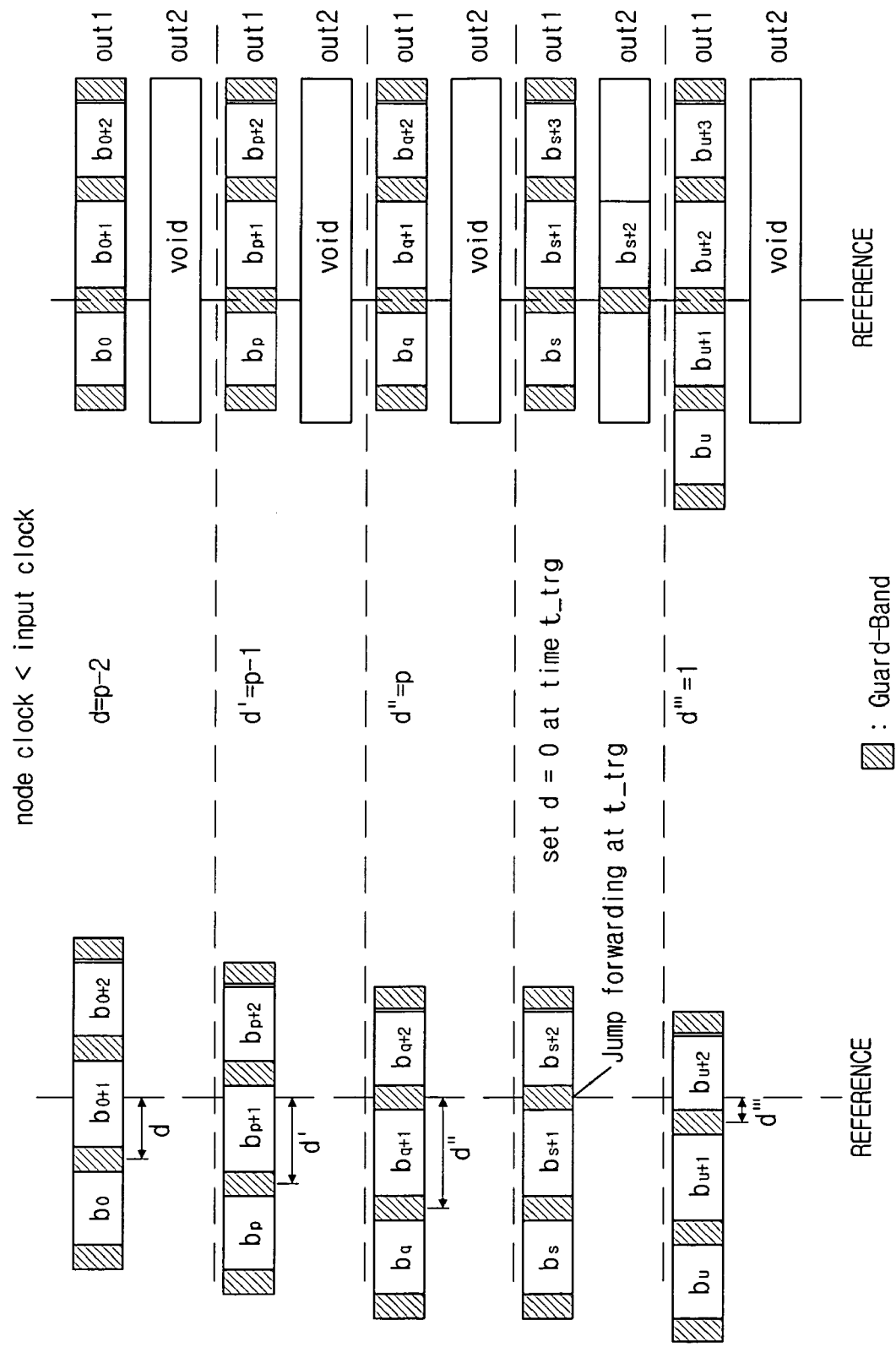
FIG. 10 is a view illustrating another example of obtaining the sync of burst data transferred from the delay adjustment section according to an exemplary embodiment of the present invention.

FIG. 10 is a view illustrating transferred burst data of which the interval is longer than the interval of the node clock according to an exemplary embodiment of the present invention.

In FIG. 10, the core node processes the burst data using the reference clock. However, since the interval of the received burst data is longer than the reference clock of the core node, a method for compensating for this difference is required.

As aforementioned, the sync detection section 706 detects the difference between the interval of the received burst data and the reference clock of the core node. As the interval of the received burst data is longer than the reference clock of the core node, the sync control section 708 directs the data separation section 702 to detect the clock difference for every incoming burst data and to separate the burst data when the clock difference matches one burst data.

In FIG. 10, first incoming burst data consists of blocks $b_o$, $b_{o+1}$, $b_{o+2}$ and respective guard bands, and is delayed for d=p−2 from the reference clock. Second incoming burst data consists of $b_p$, $b_{p+1}$ and $b_{p+2}$, and is delayed for d'=p−1 from the reference clock. Third incoming burst data consists of $b_q$, $b_{q+1}$ and $b_{q+2}$, and is delayed for d"=p from the reference clock. However, the clock difference d"=p of the third incoming burst data implies an instance when a clock difference d"' of fourth burst data which is input at time t_trg reaches one burst data.

The sync control section 708 directs the data separation section 702 to separate the burst data which is generated due to the clock difference. The data separation section 702 separates the burst data to out1 and out2 according to the direction of the sync control section 708 as shown in FIG. 10. Next, the data separation section 702 outputs the separated burst data $b_{s+2}$ to the out2 and outputs the other burst data to the out1. While the fourth incoming burst data consists of $b_s$, $b_{s+1}$ and $b_{s+2}$, the burst data of $b_s$, $b_{s+1}$ and $b_{s+3}$ is output to the out1 and the burst data of $b_{s+2}$ is output to the out2.

The sync control section 708 directs the delay adjustment 710 to shift the interval of the burst data to synchronize the other burst data with the core node.

As such, the delay adjustment section 710 can output the burst data having the same clock (the same burst data interval) as the reference clock of the core node.

Next, the OTSI 660 performs course synchronization with respect to time slots more than a certain number when the burst data synchronized with the reference clock of the core node at the fine grain FDL have time slots more than the certain number. The OTSI 660 calculates a delay value D based on Equation 2 to decide how much the course time slots are delayed.

$$D = j \times T \quad \text{[Equation 2]}$$

In Equation 2, j denotes an integer from 0 to n, and n denotes a number of course time slots.

Figure 11:
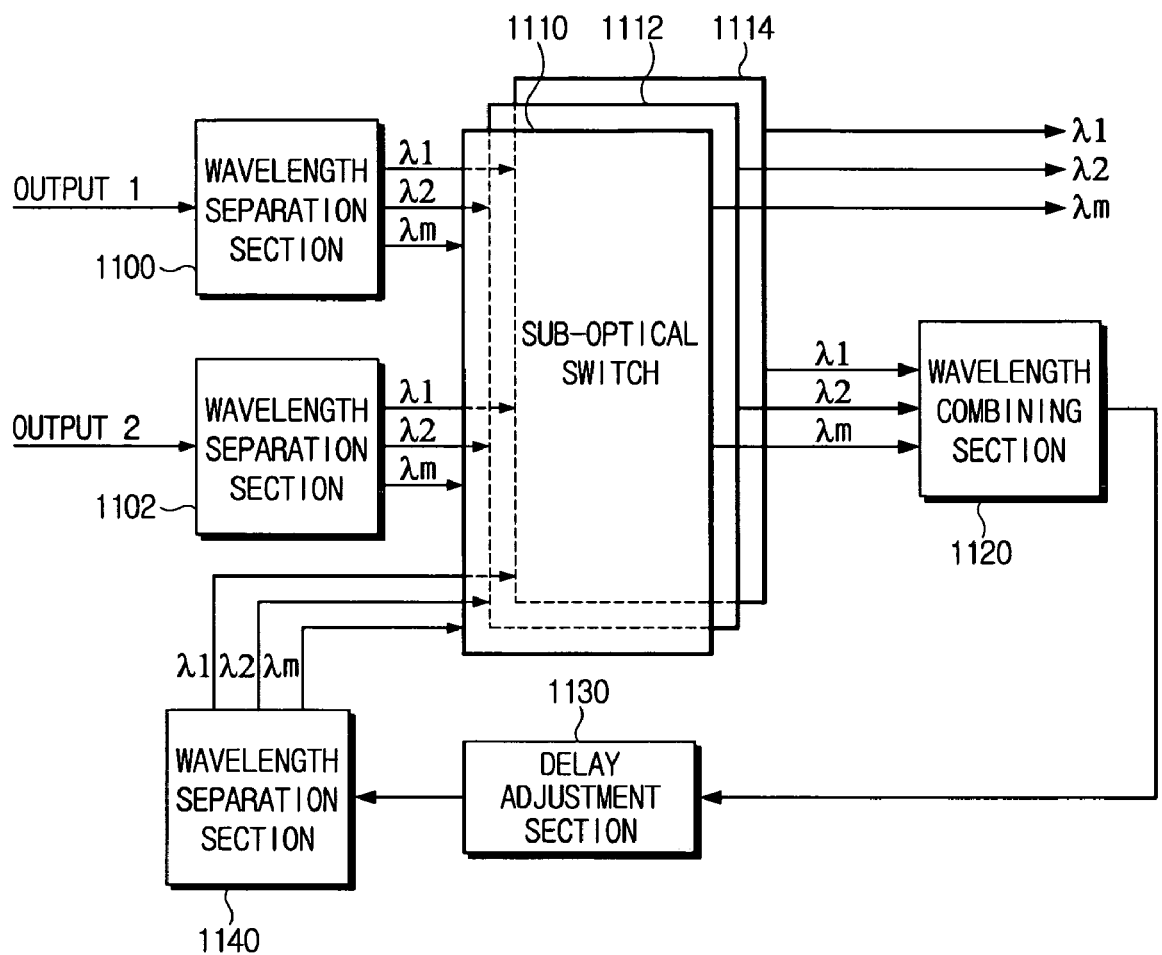
FIG. 11 is a view illustrating the construction of a pre-processing section according to an exemplary embodiment of the present invention.

FIG. 11 is a view illustrating the construction of the pre-processing section according to an exemplary embodiment of the present invention. Hereinafter, the construction of the pre-processing section 610 according to an exemplary embodiment of the present invention will be explained in detail with reference to FIG. 11.

Referring to FIG. 11, the pre-processing section 610 includes three wavelength separation sections 1100, 1102, and 1140, sub-optical switches 1110, 1112, and 1114, a wavelength combining section 1120, and a delay adjustment section 1130. The burst data output as the out1 is transferred to the wavelength separation section 1100. The wavelength separation section 1100 separates the transferred burst data by wavelengths, and transfers the separated burst data to one sub-optical switch among the sub-optical switches 1110, 1112, and 1114, respectively. The burst data output as the out2 is transferred to the wavelength separation section 1102. The wavelength separation section 1102 separates the transferred burst data by wavelengths, and transfers the separated burst data to one sub-optical switch among the sub-optical switches 1110, 1112, and 1114, respectively. The sub-optical switches 1110, 1112, and 1114 delay the transferred burst data for a certain time, which may be predetermined, and then transfer the delayed burst data to the optical switches 630 to 634 according to a control command from the control section. That is, if the sub-optical switches 1110, 1112, and 1114 intend to delay the transferred burst data for the certain time, they transfer the burst data to the wavelength combining section 1120. The wavelength combining section 1120 combines the transferred burst data having natural wavelengths and transfers the combined burst data to the delay adjustment section 1130.

The delay adjustment section 1130 delays the transferred burst data for the certain time and then transfers the delayed burst data to the wavelength separation section 1140. The wavelength separation section 1140 separates the transferred burst data by wavelengths, and transfers the separated burst data to one sub-optical switch among the sub-optical switches 1110, 1112, and 1114.

Although FIG. 11 illustrates one wavelength combining section 1120, at least two wavelength combining sections may be illustrated instead. That is, in the case when first to third wavelength combining sections are provided, the burst data that require a delay for a first set time are input to the first wavelength combining section, and the burst data that require a delay for a second set time are input to the second wavelength combining section. Additionally, the burst data that require a delay for a third set time are input to the third wavelength combining section. In this case, delay adjustment sections corresponding to the respective wavelength combining sections are provided, and the corresponding delay adjustment section delays the transferred burst data only for the set time to output the delayed burst data.

As described above, according to exemplary embodiments of the present invention, it is possible to realize the apparatus and method for adjusting a receiving time point of burst data and obtaining synchronization by compensating for the difference of the receiving time point of the burst data and the reference clock of the node, which occurs due to physical difference of links that connect nodes establishing an optical switching network. By compensating for the receiving time point and the size of the burst data being received as described above, the switching efficiency of optical switches that constitute the node can be increased. Additionally, by increasing the switching efficiency of the optical switches, the number of burst data which may be lost during the switching process can be reduced.

The foregoing embodiments are merely exemplary and are not to be construed as limiting the present invention. The present teaching can be readily applied to other types of apparatuses. Also, the description of exemplary embodiments of the present invention is intended to be illustrative, and not to limit the scope of the claims, and many alternatives, modifications, and variations will be apparent to those skilled in the art.

What is claimed is:

1. A method for adjusting a receiving time point of burst data in an optical burst switching network, the method comprising:

comparing a reference time point of a node with a time slot boundary of the burst data to detect a difference between the time slot boundary of the burst data and the reference time point of the node; and adjusting the time slot boundary of the burst data with the reference time point according to the detected difference, wherein the adjusting either inserts at least one void data into the burst data or separates at least one burst data from the burst data to output the separated data to an output different from an output for the burst data from which the at least one burst data is separated, if the detected difference is one burst data, and wherein the one void data has the same size as that of the one burst data.

2. The method of claim 1, wherein the adjusting further comprises shifting and re-aligning the time slot boundary with the reference time point.

3. The method as claimed in claim 2, wherein the shifting and re-aligning matches the reference time point to the time slot boundary of the burst data.

4. The method as claimed in claim 1, wherein the adjusting inserts at least one void data into the burst data.

5. The method as claimed in claim 1, wherein the adjusting separates at least one data from the burst data.

6. The method as claimed in claim 1, wherein the adjusting comprises inserting a separated data into void data of another burst data.

7. The method as claimed in claim 1, further comprising acquiring information about the time slot boundary of the burst data from a burst control packet.

8. The method as claimed in claim 7, wherein the burst control packet includes control information about the burst data.

9. An apparatus for adjusting a receiving time point of burst data in an optical burst switching network, the apparatus comprising:
- a sync detection section which is configured to detect a difference between a time slot boundary of the burst data and a reference time point of a node; and
- a sync control section which is configured to control shifting and re-aligning the received burst data with the reference time point and to control either inserting at least one void data into the burst data or separating at least one burst data from the burst data to output the separated data to an output different from an output for the burst data from which the at least one burst data is separated, if the detected difference is one burst data, wherein the one void data has the same size as that of the one burst data.

10. The apparatus as claimed in claim 9, further comprising:
- a data separation section which is configured to separate at least one data from the received burst data according to a burst data separation direction of the sync control section; and
- a delay adjustment section which is configured to insert at least one void data into the burst data according to a burst data insertion direction of the sync control section.

11. The apparatus as claimed in claim 10, wherein the sync control section controls the delay adjustment section to match the time slot boundary of the burst data with the reference time point.

12. The apparatus as claimed in claim 11, wherein the delay adjustment section delays the burst data to match the time slot boundary of the burst data with the reference time point according to the direction of the sync control section.

13. The apparatus as claimed in claim 9, further comprising:
- an optical separation section which is configured to separate the received data into burst data and a burst control packet.

14. The apparatus as claimed in claim 13, wherein information about the receiving time point and the time slot boundary of the burst data is acquired from the burst control packet.

15. The apparatus as claimed in claim 14, wherein the burst control packet includes control information about the burst data.

* * * * *